Figure 1:
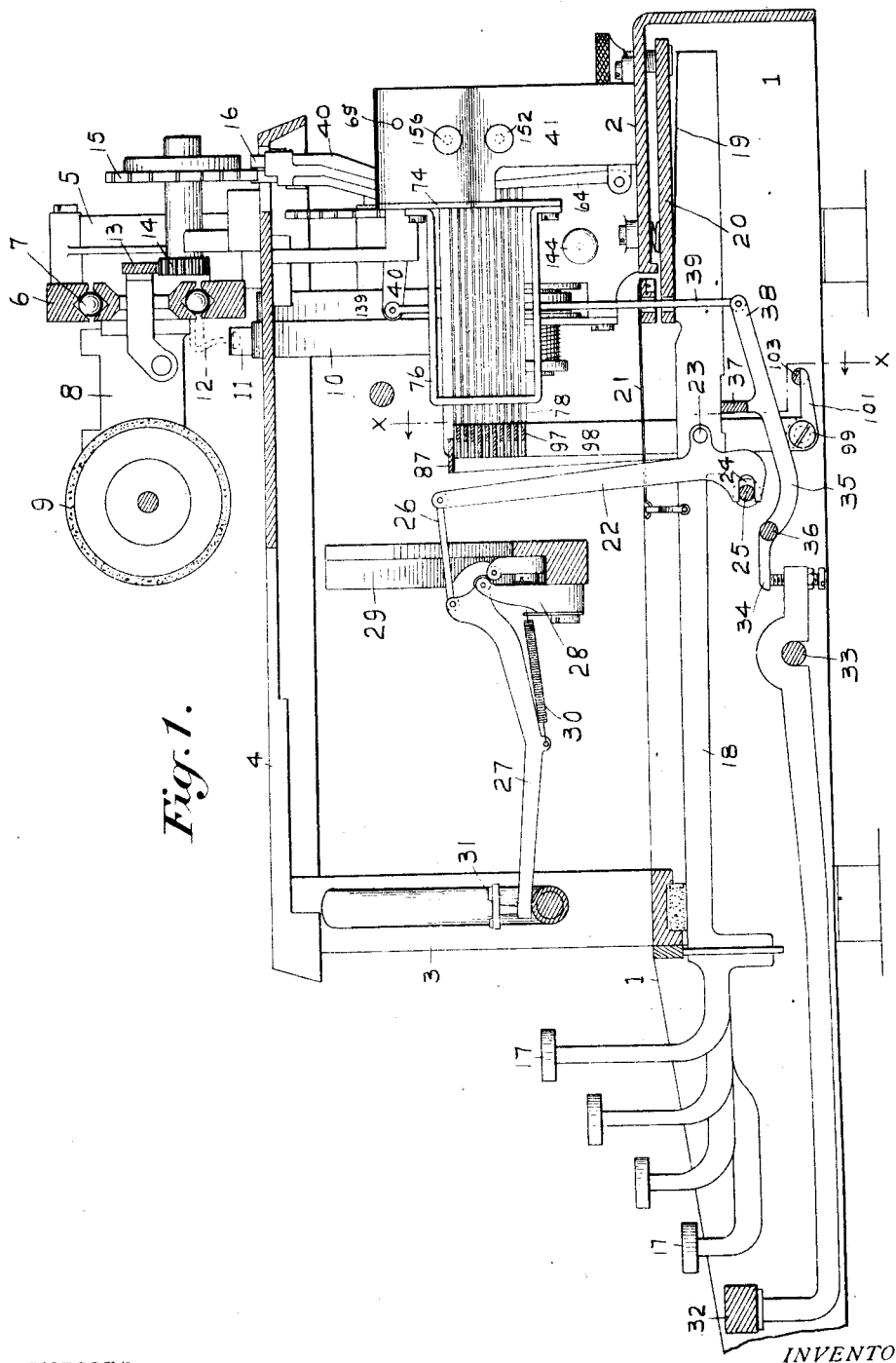

H. H. STEELE.
COMBINED TYPE WRITER AND TELEGRAPH TRANSMITTER.
APPLICATION FILED MAY 11, 1908.

1,071,819.

Patented Sept. 2, 1913.

8 SHEETS—SHEET 1.

WITNESSES:
Chas. J. Bond
Hubbard N. Joslyn

INVENTOR
Herbert H. Steele

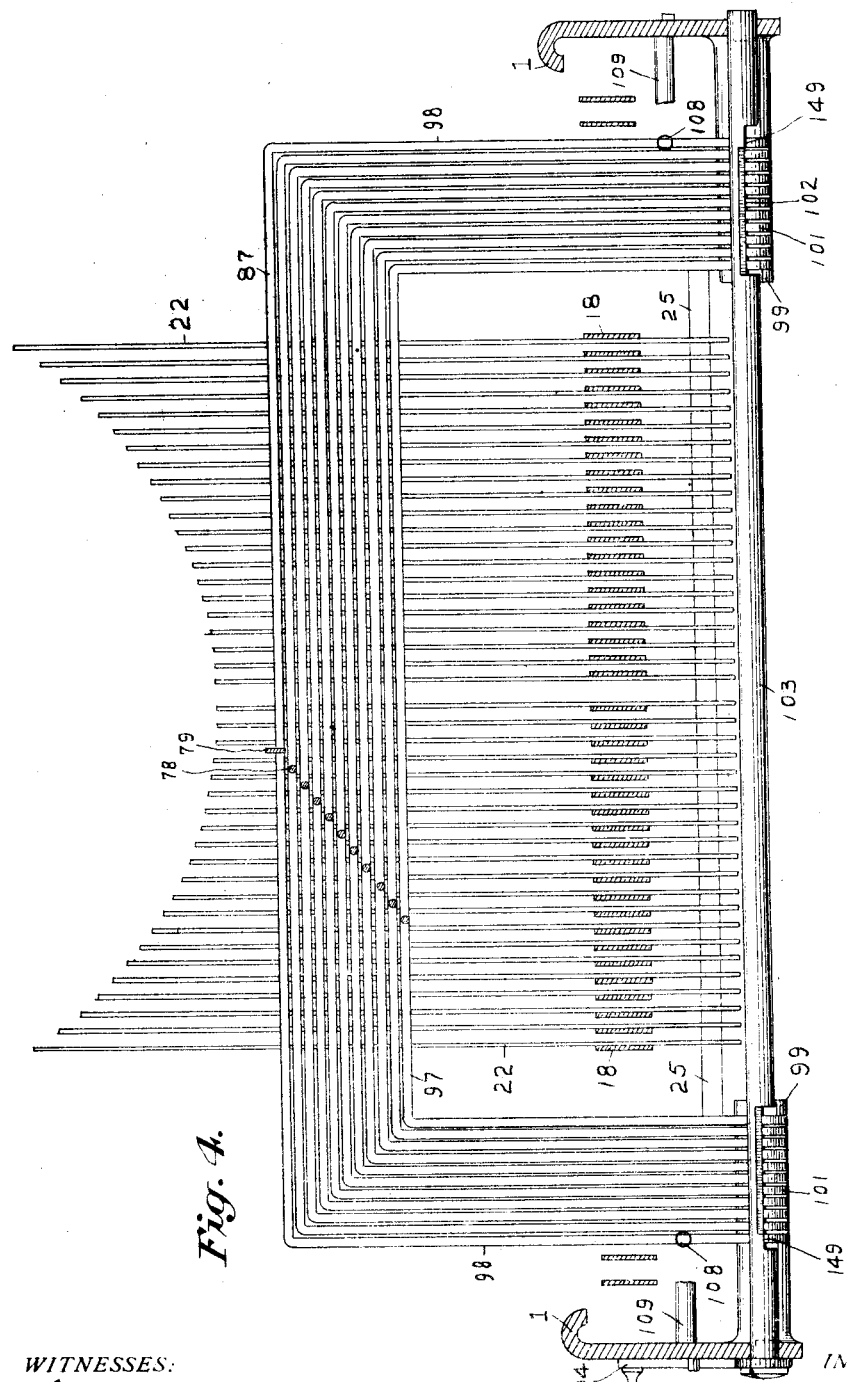

H. H. STEELE.
COMBINED TYPE WRITER AND TELEGRAPH TRANSMITTER.
APPLICATION FILED MAY 11, 1908.
1,071,819.
Patented Sept. 2, 1913.
8 SHEETS—SHEET 4
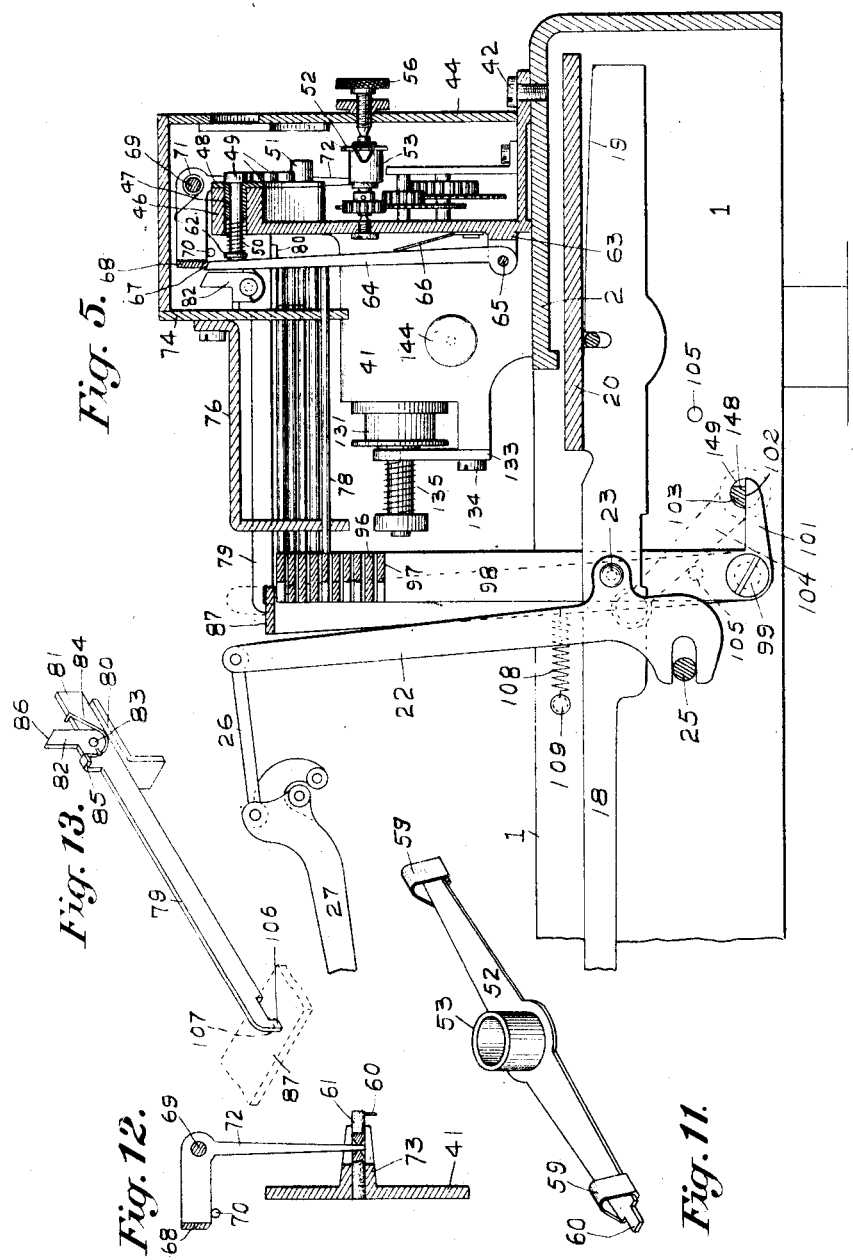
WITNESSES:
Chas J. Bond
Hubbard W. Joslyn
INVENTOR.
Hubert H. Steele.

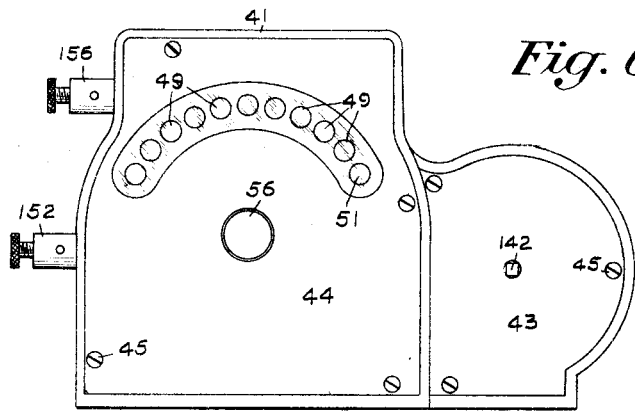
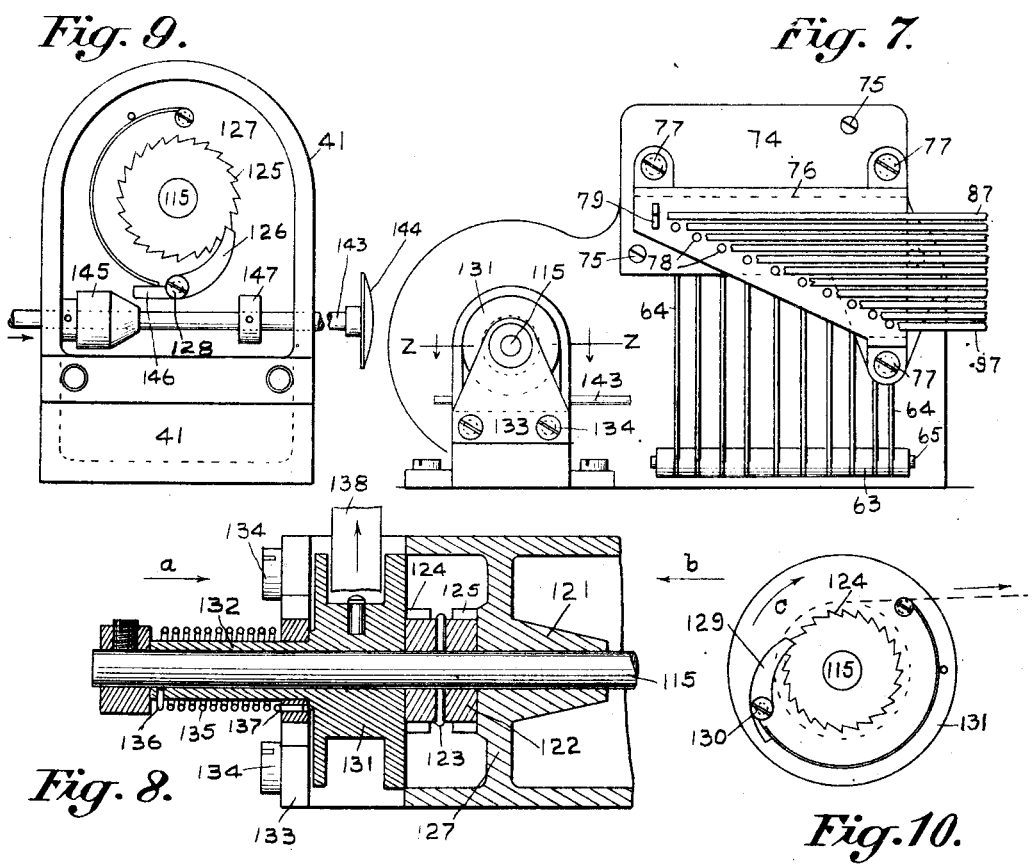

H. H. STEELE.
COMBINED TYPE WRITER AND TELEGRAPH TRANSMITTER.
APPLICATION FILED MAY 11, 1908.
1,071,819.
Patented Sept. 2, 1913.
8 SHEETS—SHEET 8.
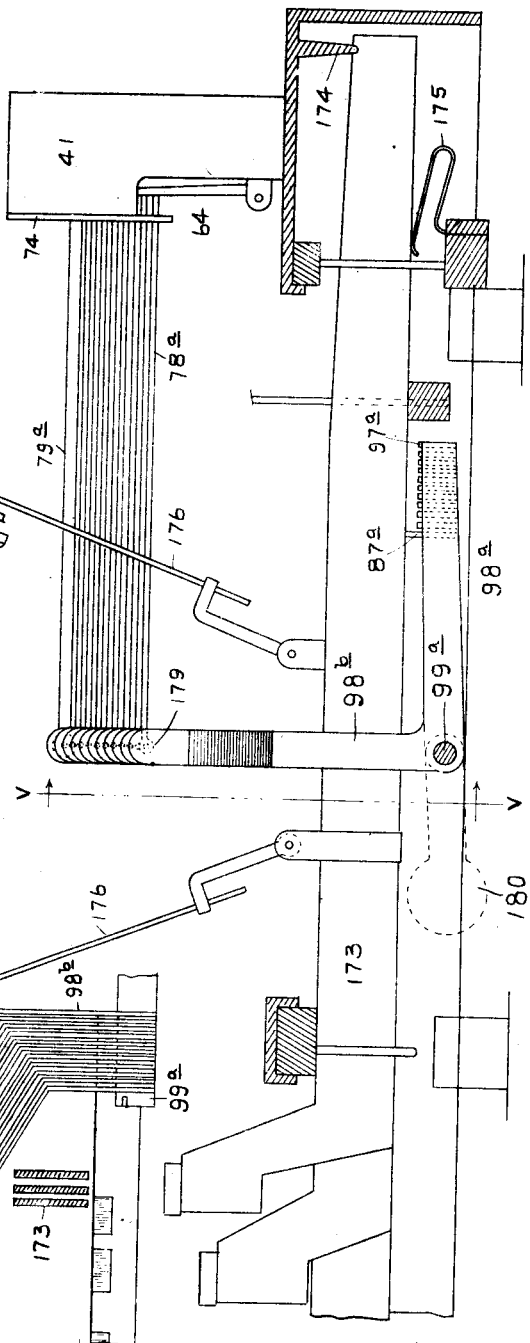
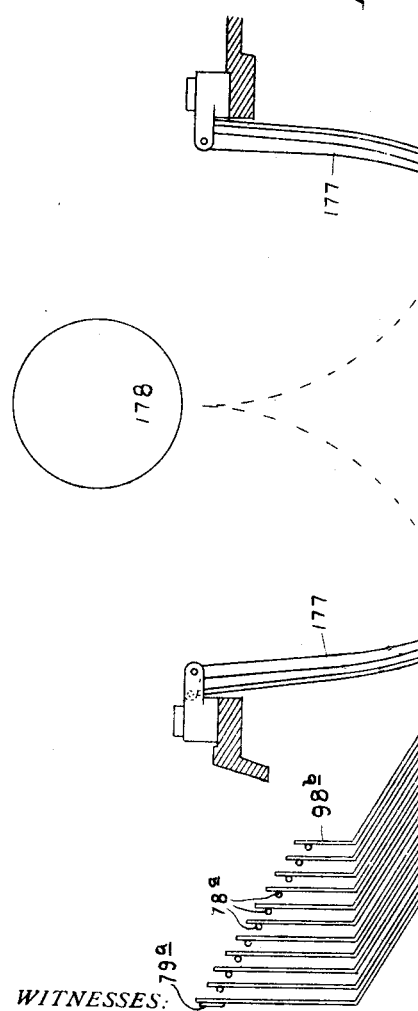
WITNESSES:
Chas. J. Bond
Husband N. Jselyn
INVENTOR.
Herbert H. Steele.

UNITED STATES PATENT OFFICE.

HERBERT H. STEELE, OF MARCELLUS, NEW YORK, ASSIGNOR, BY MESNE ASSIGNMENTS, TO REMINGTON TYPEWRITER COMPANY, OF ILION, NEW YORK, A CORPORATION OF NEW YORK.

COMBINED TYPE-WRITER AND TELEGRAPH-TRANSMITTER.

1,071,819.

Specification of Letters Patent.   Patented Sept. 2, 1913.

Application filed May 11, 1908.   Serial No. 432,234.

*To all whom it may concern:*

Be it known that I, HERBERT H. STEELE, a citizen of the United States, residing at Marcellus, in the county of Onondaga and State of New York, have invented a new and useful Combined Type-Writer and Telegraph-Transmitter, of which the following is a specification.

My invention relates to a combination machine, in which the manipulation of the character keys of the typewriter projects their associated printing elements to the printing position and simultaneously transmits to an electric circuit the Morse representations of the characters printed.

One object of my invention, is to provide a battery, group or series of normally inactive electrical contacts that are connected through intermediate mechanisms with the printing elements of a typewriter, and so arranged, constructed and operated that when a predetermined printing element is actuated, a sub-series or sub-group of these contacts is rendered operative and the number, position and relationship of these active contacts in the sub-series, being the Morse representation of the printing element actuated; that is to say, by a single stroke of the character key, the intermediate mechanism sets up, composes or resolves individually into a sub-series, the necessary number of active contacts in proper relationship to transmit to the line circuit, the associated Morse signals.

Another object, is to provide a series of normally inactive electrical contacts, with means coöperating with the printing elements of a typewriter, for automatically selecting and maintaining certain of said contacts in operative position and proper relationship, to transmit to the line circuit, the selected Morse characters.

Another object, is to provide a series of electrical contacts that normally are inactive but individually movable to operative position by a key-actuated means for controlling, positioning and maintaining said contacts in sub-series; with means automatically released by said key-actuated means, to coöperate with the selected contacts and transmit to the line circuit, the associated impulses representative of the predetermined Morse signal.

Another object, is to provide a transmitting attachment that may be adjusted to any standard typewriting machine without mutilation, and coöperate with the existing typewriting mechanisms to simultaneously print a character and transmit its Morse representation to a distant receiving station.

Subordinate to the several objects recited are others, which will appear more fully as the following description of the drawings illustrating my invention is developed.

Figure 2:
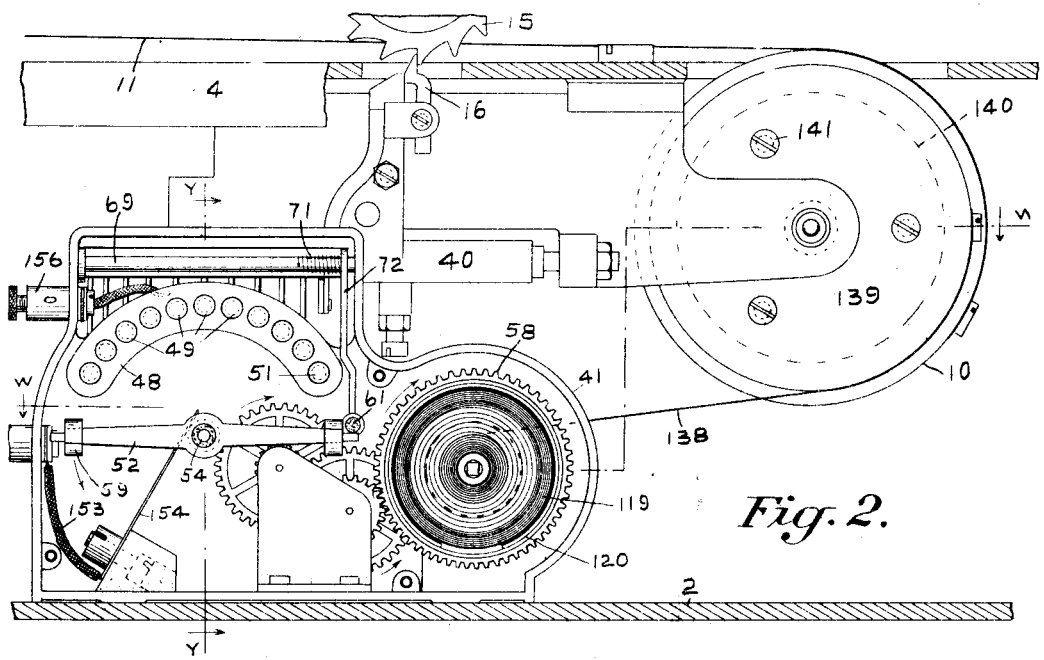
Figure 3:
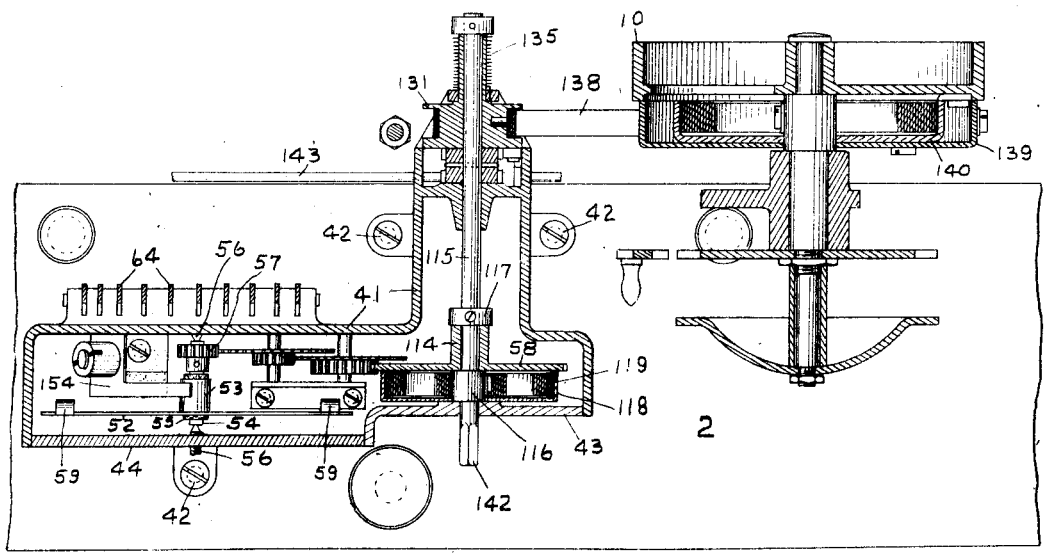
Figure 14:
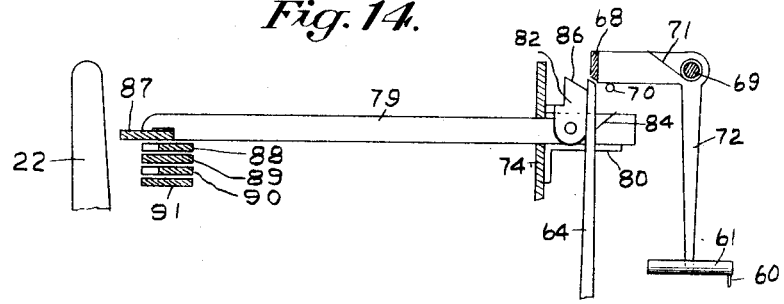
Figure 15:
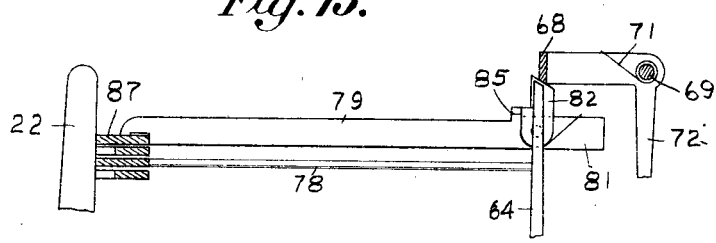
Figure 18:
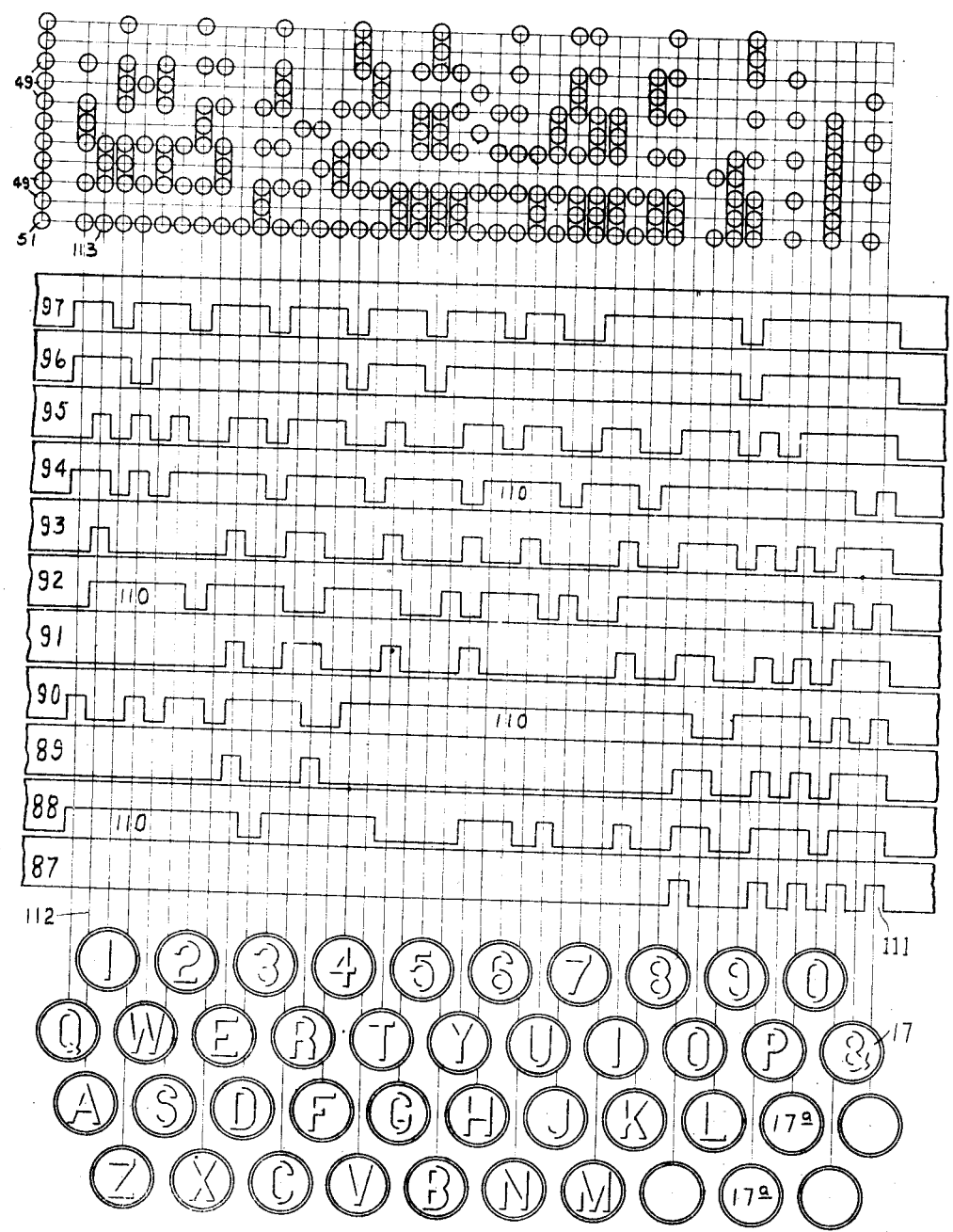

In the drawings, Figure 1 is a longitudinal vertical section showing my attachment assembled to the frame and adjusted in operative relation to the coöperative parts of the Monarch typewriter. Fig. 2 is a full size rear elevation of part of Fig. 1 with the cover plate of the transmitter removed. Fig. 3 is a horizontal section through Fig. 2 approximately through the plane indicated by the line w, w. Fig. 4 is a vertical cross section through Fig. 1 on the plane indicated by the line x, x. Fig. 5, is a vertical section through the transmitter and base portion of the typewriter, the plane thereof being indicated by the line y, y, of Fig. 2. Fig. 6 is a full size rear elevation of the transmitter. Fig. 7 is a front elevation of Fig. 6. Fig. 8 an enlarged section through the winding-up portion of the transmitter at the plane indicated by the line z, z, of Fig. 7. Fig. 9 an end elevation of Fig. 8 looking in the direction of the arrow a, with some of the parts removed. Fig. 10 a side view of the flanged wheel of Fig. 8 looking in the direction of the arrow b. Fig. 11, an enlarged view in perspective of the transmitting brush. Fig. 12 a full size fragmentary view of the non-conducting stop member that intermittently arrests the rotation of the transmitting brush of Fig. 11. Fig. 13 a full size view in perspective of the mechanism that releases the old sub-series of contacts simultaneously with the projection of a new sub-series to operative relationship to the transmitting brush. Figs. 14, 15, 16 and 17 are diagrammatic views illustrating the contact selecting mechanism and the coöperative releasing mechanism for the transmitting brush. Fig. 18 is a diagrammatic view illustrative of the selecting mechanism, its relation to the character key board, and the sub-series of active contacts associated with each character key. Fig. 19 illustrates a modification of the preferred form, where the selecting mechanism is positioned to coöperate with the key levers of a typewriting machine. Fig. 20 is a front elevation of the right hand portion of Fig. 19, as indicated by the line v, v.

Referring more particularly to Figs. 1, 2 and 5, 1 indicates the base frame provided with a covered rear portion 2, and suitable posts 3 that support the top plate 4. Rising from the top plate 4 are posts or brackets 5 adapted to support two stationary carriage rails 6 that are formed with suitable bearing faces to coöperate with anti-friction elements 7 that guide and control the carriage 8 and its associated platen 9. The carriage 8 in one direction is under the control of the spring motor 10 through the tape 11 secured at one end to the arm 12 of the carriage and the opposite end to the said motor. The carriage feeding movement is controlled by the pivoted feed rack 13 coacting with the pinion 14, the escapement wheel 15 and the associated escapement dogs 16.

17 indicates the character keys arranged in four banks at the keyboard and each provided with a lever portion 18 that is formed with a tread 19 to coöperate with the adjustable fulcrum plate 20 and held in proper relationship thereto, by individual springs 21. Each key lever is provided with a bellcrank lever 22 that is pivoted at 23 to said lever and formed at the lower end with an open slot 24 arranged to engage with a stationary fulcrum rod 25. The upper end of each bellcrank 22 has a connection 26 to its associated typebar 27. Each typebar is provided with individual hangers 28 that are adjustably secured to the segment 29, a suitable recoil spring 30 and type elements 31.

32 indicates the usual space key that is fulcrumed at 33 and adapted to engage with the arm 34 of the rocking frame 35 that is fulcrumed at 36 and comprises a universal bar 37 to abut the lower faces of the whole series of key levers 18 and a central arm 38 that transmits motion through the connection 39 to the escapement rocker 40 to vibrate the escapement dogs 16 through the teeth of the wheel 15. The mechanism described up to this point, will be found in what is known commercially, as the Monarch typewriter.

Referring to Figs. 2, 3, 5 and 6, 41 indicates a suitable casing that is secured to the base section 2 by the screws 42, and may be provided with sectional cover plates 43 and 44 that are removably secured by screws 45. Interiorly of the casing 41, is a segmental lug 46 that is drilled at intervals to receive ten bushings 47 that may be formed integrally with a segment plate 48. This latter plate and the bushings are constructed of suitable electric conducting material. Each bushing forms a bearing for a movable contact 49 that is provided with a light spring 50 that normally retains the said contact in its inoperative position, as shown at Fig. 5. 51 indicates a stationary contact that projects beyond the faces of the adjoining ten contacts to always assume an operative position relative to the transmitting brush, as will presently be described. 52 indicates a two-armed member formed with a barrel 53 that is secured to, but insulated from, the axle 54 by a non-conducting sleeve 55. The axle 54 is arranged to rotate upon miter-pointed screws 56 at each end and is provided with a pinion 57 that is geared, through a train of intermediate gearing, to a driving gear 58. Each one of the arms 52 is provided with a wiper or brush 59 that is positioned and adjusted to sweep over the field of the eleven contacts 49 and 51, and the extreme ends thereof at 60 are adapted to collide with an insulated stop 61 to check the rotation of the brushes 59 at every semi-revolution of the axle 54 and its associated members. Each one of the ten contacts 49 is provided with a cap 62, adapted to engage with the spring 50 and maintain its associated contact normally in an inoperative or inactive position relative to the transmitting brushes 59. 63 indicates an elongated lug cast integral with the casing 41 and slotted transversely to receive ten levers 64. These levers swing upon a fulcrum wire 65 that is common to the whole series and are spring pressed by individual flat springs 66 secured to the casing 41. These ten levers are arranged in parallel vertical planes and positioned to bisect the axes of the ten contacts 49 and coöperate with the rounded faces of the caps 62. The upper free ends of the levers 64 are beveled as 67, uniformly as a series, and adapted to coöperate with a locking bar 68 that is fulcrumed on a stationary rod 69 and spring-pressed to normal position against the stop pin 70, by the spring 71 coiled about the rod 69 as shown at Figs. 2 and 5. Formed integrally with the bar 68, is a downwardly extending arm 72 that engages at its lower free end, with the non-conducting stop 61 that is capable of vibrating to and fro within a suitable housing 73 forming part of the casing 41. 74 is a plate secured to the front side of the casing 41 as by screws 75 and to this plate is secured a bracket 76 by the screws 77. The plate 74 and the front face of the bracket 76 are perforated to form bearings for a series of ten push rods 78 that are positioned to aline with the ten levers 64 and also with ten horizontally arranged bars, presently to be described.

Referring to Figs. 13, 79 indicates a push bar that is positioned relative to the ten push rods 78, to aline with the position of the active contact 51. This bar is provided with suitable bearings through the plate 74 and bracket 76 and is further provided with a bearing face 80 to relieve the strain of the overhanging end 81. The bar 79 is provided with a pawl 82 that is pivoted to the said bar at 83 and provided with a spring 84 that normally holds the said pawl spring pressed against the stationary stop 85. The upper end of the pawl 82 is formed with a cam face 86 that is adapted to coöperate with the locking bar 68, to vibrate the said bar against its spring 71, when the pawl and its associated push bar 79 is moved rearwardly.

Referring to Figs. 1, 4 and 5, 87 to 97 inclusive indicate eleven horizontally arranged bars, each formed with vertically disposed members at both ends as 98, that are fulcrumed as a series at 99 to the side walls of the base frame 1. Each member 98 is formed with a rearwardly projecting horizontal arm 101 adapted to coöperate with suitable cam faces 102 formed within a rock shaft 103 that takes bearings at each end thereof in the frame 1. This rock shaft is provided with a shifting arm 104 on the outside of the frame 1 and the motion thereof is confined between the two stop pins 105. The ten bars 88 to 97 coöperate with the ten push rods 78, their relative positions being shown at Fig. 4. The upper bar 87 of the series, is connected positively to the push bar 79 as shown at Fig. 13, by a tongue 106 passing within a slot 107 in the said bar. From what has been described, it will be understood that the springs 66 tend to push the levers 64 against the rods 78 and the said rods against the rear edges of their associated bars 88 to 97, and that the reaction from the said springs 66 is checked through the abutment of the arms 101 against the cam faces of the rock shaft 103. The push bar 79, however, does not coöperate with a lever 64 and hence a spring 108 is provided at each member 98 of the bar 87 to return the said bar and its associated push bar 79, to normal position, or to the position determined by the associated arm 101 coacting with the cam face 102; the said springs 108 being secured to stationary posts 109 at both sides of the frame 1.

Referring to Fig. 18, it will be seen that the front edges of the eleven bars 87 to 97 are more or less mutilated and the object of this mutilation is to provide gaps 110 for clearance for certain of the adjacent bellcranks 22. The bar 87 that corresponds to the initial contact 51 is operative to the whole series of character keys; the gaps 111 being formed to clear the bellcranks of the five blank keys 17ᵃ that are usually employed for punctuation. The remaining bars 88 to 97 that operate the ten normally inactive contacts 49 have gaps at irregular intervals. It will also be seen from the profile at the upper part of this figure, that the eleven contacts 49 and 51 form a continuous series of units that are all equal to each other in duration relative to the transmitting brush. That any single unit projected to the field of the brush, will indicate a "dot"; the projection of three adjoining units to the same plane, will indicate a "dash"; and the joint projection of five adjoining units will indicate a "long dash". That when the first and third units are projected, the second inoperative unit makes a space or break to form two successive "dots", and where two adjoining units are skipped, a double space in time is formed. The spacing of the eleven units or contacts 49 and 51 and the relative velocity of the brushes 59 is such, that when three adjoining contacts are simultaneously projected within the field of the said brushes, the operative brush will pass from one contact to the adjoining one without making a break in the circuit; and hence, when three adjoining units are projected, the brush transmits an active unbroken interval equivalent to three units of time and is translated at the receiving station for a "dash". In the chart shown at Fig. 18, groups of adjoining units are shown connected together, to indicate an equivalent for an unbroken contact of equal duration. When the bellcrank 22 associated with the "A" key is shifted rearwardly, the plane thereof is indicated at 112 and the bars 87, 89, 90, 91 are vibrated rearwardly to project the associated contacts 51 and 49 into the field of the transmitting brushes 59, and form a sub-series of active contacts relatively positioned as at 113, forming a dot and a dash that is the Morse representation for the letter "A". Similarly, the "E" key through its associated bellcrank, operates the bar 87 only and the normally active contact 51 becomes the equivalent to a dot, the Morse representation for the letter "E". In this manner, the series of bars 87 to 97 comprise a selective mechanism, that coöperates with the bellcranks 22 to project the normally inactive contacts 49 into operative relation to the transmitting brushes 59, to form subseries or groups; the number, position and relationship of the active contacts, being the Morse representation of the character key actuated. It will be noted, that the series of eleven bars 87 to 97 are arranged vertically over the axis 99 and hence, by themselves, are in a state of equipoise. By such an arrangement, the power required to vibrate these bars collectively or individually, is comparatively nothing and, the lightest form of spring 66, consistent with the necessary speed, will return these bars to normal position through their associated rods 78.

Referring now to Figs. 2, 3, 7, 8, 9 and 10, the driving gear 58 is provided with a hub 114 that gives a long bearing for the said gear 58 upon the shaft 115, between the enlarged section 116 and the adjustable collar 117. This gear is free to turn upon the shaft 115 and is provided with a spring-box 118 secured thereto. A flat clock spring 119 has its inner end secured to the shaft section 116 and the other end secured to a split ring 120 that is frictionally maintained against the inner periphery of the casing or spring box 118. The shaft 115 has a bearing through the cover plate 43, and an interior bearing at 121. 122 indicates a ratchet wheel secured to the shaft 115 as with a pin 123, and comprises two toothed members 124 and 125. A spring pressed pawl 126 is pivoted to the face of the partition wall 127 at 128 and adapted to engage with the teeth 125, to prevent rotation of the shaft 115 in one direction. A second spring pressed pawl 129 is pivoted at 130 to the face of a flanged pulley or wheel 131, to drive the shaft 115 and the associated parts in one direction. The pulley 131 is arranged to turn freely upon the shaft 115 in a direction not antagonistic to the pawl 129, and is formed with a long sleeve 132 that takes a bearing in the bracket 133 that is secured to the casing 41 by screws 134. A spring 135 is adjusted around the sleeve 132 with one end secured thereto at 136 and the opposite end secured at 137 to the bracket 133. 138 indicates a tape secured at one end to the pulley 131 and the opposite end secured to the outer periphery of a cup-shaped member 139 that is secured to the spring box 140 by the screws 141. The said spring box 140 forming part of the regular equipment of the carriage motor 10 that controls the carriage 8 through the tape connection 11. From this description, it will be seen that motion in one direction is transmitted from the motor 10 through the tape 138 to the pulley 131 and that the pulley and the associated pawl 129 becomes a driving element to the ratchet wheel 124 and the shaft 115. That when such motion is transmitted to the shaft 115 in the direction of the arrow c Fig. 10, the said shaft winds up the spring 119 and thus stores up an energy associated with the driver gear 58, to rotate the axle 54, carrying the transmitting brushes 59, for an extended interval. It will also be seen that the function of the pawl 126 is to check the unwinding tendencies of the spring 119, during the interval that the tape 138 is inoperative and while the carriage 8 is moving in a letter space direction. The shaft 115 may be squared at the outer end as shown at 142 to provide for a supplemental keywind for the spring 119.

As stated preliminarily, the primary object of my invention is to print a character and simultaneously transmit its Morse equivalent to the line wire. It may, however, be advantageous at times for the combination machine, to perform singly its ordinary function as a typewriter. With this end in view, I have shown at Fig. 9 a cut-out device, comprising a push rod 143, provided with a finger button 144; a cam member 145 permanently secured to the said rod and adapted to engage with the tail-end 146 of the pawl 126 to temporarily disengage the said pawl from the teeth 125. The shifting motion of the rod 143, in one direction is arrested by the abutment of the reduced end of the cam 145 with the interior wall of the casing 41, and in the opposite direction by the adjustable collar 147. The disengagement of the pawl 126 prevents the continuous winding up of the spring 119 during the to and fro movement of the carriage when the transmitting elements are inactive.

With the shifting of the rod 143 to cut out the winding-up elements of the transmitter motor, the lever 104 is shifted to rock the shaft 103 and bring the cam face 148 into engagement with the arms 101 to vibrate the whole series of bars 87 to 97 rearwardly and out of the operative field of the bellcranks 22. In this connection, it will be noted, that the bar 87 has a longer operative movement than the bars 88 to 97, hence a special cam face 149 is provided for the associated arms 98, so that the whole series of bars will lay in a uniform inoperative plane.

When a key 17 is depressed, the keylever 18 through the pivotal connection at 23 and the stationary fulcrum rod 25, causes its associated bellcrank 22 to swing rearwardly to exert a pull on the connection 26 to raise the typebar 27 and project a type face 31 against the platen 9 at the printing position. Simultaneously with the rearward motion of the bellcrank 22, the bar 87 and one or more of the associated bars 88 to 97, are moved rearwardly in unison. The push bar 79 and the selected push rods 78 are forced rearwardly; the former, to raise the bar 68, vibrate the arm 72 and withdraw the non-conducting stop 61 out of the rotary field of the end 60 of the brush carrier 52. This releases the brushes 59 to the action of the spring motor, to rotate in the direction of the arrow of Fig. 2. Simultaneously, the selected push rods 78 vibrate the levers 64 and project their associated contacts 49 to the plane of the normally active contact 51, to form with the said contact 51, the necessary "makes and breaks" in the brush-circuit, to transmit the Morse equivalent of the character key depressed. This action is diagrammatically shown through several stages in Figs. 14 to 17. At Fig. 14, the various parts are shown in normal or inoperative position. The initial movement of the bell crank 22 shifts the bar 87 and the pawl 82 to the position shown at Fig. 15, where the said bellcrank is just touching the operative bars 89 and 91 and the cam face 86 of the pawl 82 is in engagement with the locking bar 68. A continued movement of the bellcrank 22 shifts the lever 64 in unison with the pawl 82, while the cam face 86 of the latter vibrates the bar 68 about the fixed axis 69 and against the spring 71, to withdraw the stop 61 out of the field of brush carrier member 60. A slight further movement of the bellcrank 22 causes the bar to pass over the pawl 82 and drop behind the pawl and the active levers 64 and simultaneously shifts the stop 61 to intercept the advancing second arm of the brush holder. At the end of the key stroke, the bellcrank returns to normal position and the bar 87 under the influence of the springs 108 follows up this return movement of the bellcrank. The pawl 82 swings about its axis as shown in dotted lines at Fig. 17, to pass under the bar 68 and snap back to normal position against its stop 85.

Figure 16:
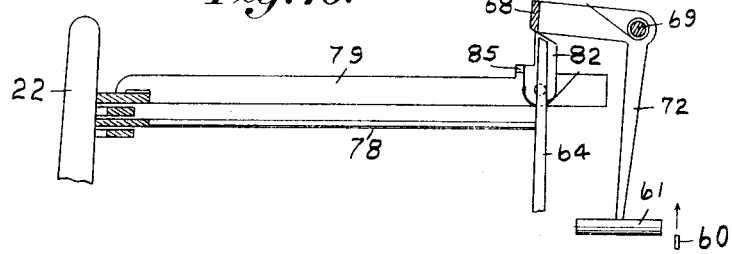
Figure 17:
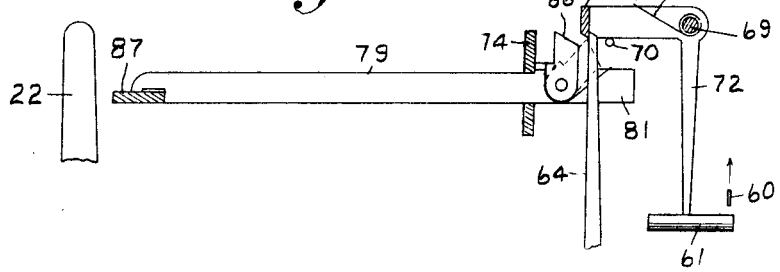

When the second key is depressed, if it should happen to be the same key, the bellcrank will first collide with the bar 87 which moves to the position of Fig. 16 where the previous subseries of levers 64 are released to be immediately re-projected to their active or operative positions. Should the second key, be different from the first and call for a new selection of contacts whether more or less in number, those of the first subseries that are not required in the composition of the second sub-series, will immediately return to normal position when the cam faced pawl 82 raises the locking bar 68.

In using a combination machine of this character to transmit the Morse characters, the transmitting operator is provided with the regulation key and sounder at the side of the typewriter, and simultaneously with the manipulation of the character keys and the transmission of the Morse equivalents, these latter are automatically repeated through the sounder mentioned at the side of the transmitting operator. If from any cause, the receiving operator misunderstands any signal, a cutting-out switch at the receiving station immediately silences the transmitting sounder and the transmitting operator suspends operations and shifts the carriage back to the doubtful word and then reprints the several characters.

When the machine is to be used as a receiver for messages, the cut-out switch of the Morse key is opened. The operator shifts the lever 104 rearwardly to successively move the whole series of bars 87 to 97 to inoperative positions, shift the ten contacts 49 to operative positions and lock them, release the adjacent brush 59 and arrest the advancing brush with the stop 61. The rod 143 is now shifted to disengage the check pawl 126 and allow the shaft 115 to rotate in two directions in unison with the to and fro movement of the carriage. The operator now receives the signals from the sounder at the side of the machine and translates them on the typewriter. When it is desired to restore the transmitting elements, the rod 143 is shifted in the opposite direction to release the pawl 126 that immediately engages with the toothed member 125; the lever 104 is shifted forwardly to the position of Fig. 5; the bar 87, connection 79 and pawl 82 return to normal positions under the influence of the spring 108; the remaining bars 88 to 97 and push rods 78 are not affected by the movement of the rod 103, because the ten contacts 39 are still locked by the bar 68. The operator now strikes any character key to vibrate the bar 87, and the associated pawl 82 raises the locking bar 68 to simultaneously release the contacts that return to their normal inoperative positions under the influence of their springs 50, while the rods 78 and bars 88 to 97 are restored to operative positions by the springs 66. The closing of the switch at the Morse key completes the operation.

It is assumed that when the first character is printed, the carriage of the typewriter is positioned at the right hand of the machine, and that the said carriage moves letter space distances as each character is printed. It is also assumed that when the said carriage was shifted to the right hand, the tape 138 charged the transmitter spring 119, through pawl 129 engaging with the teeth 124 and rotating the shaft 115, which is maintained in this wound-up position through the engagement of the pawl 126 with the teeth 125.

When the type bar 27 is projected to the platen, the escapement mechanism permits the carriage to move a letter space distance. This movement of the carriage causes a slack in the tape 138 and this slack is taken up by the spring 135 that rotates the pulley 131 in a direction opposite to the arrow $c$ of Fig. 10; the pawl 129 snapping idly over the teeth 124, without motion to the shaft 115. At the end of the line of print, the tape 138 has been practically unwound from the supplemental drum 139 and wound-up on the pulley 131. In the meantime, the rotation of the brushes 59 has partially exhausted the driving spring 119. When the carriage is projected to the right hand for a new line of print, the tape 138 is drawn from the pulley 131 to the drum 139; the pawl 129 rotates the shaft 115 in unison with the said pulley 131, to recharge the spring 119 and simultaneously winds up the spring 135 that rotates the said pulley to take up the slack in the tape 138, during the movement of the carriage and platen in a letter space direction. The relation of the drum 139 to the pulley 131, and the driving gear 58 and intermediate train of gearing to the axle 54, is such that when the carriage is thrown to the right hand a predetermined number of letter space distances, this rightward movement of the carriage stores up in the spring 119, sufficient energy to operate the brushes 59 during the interval that the carriage is moving through the same number of letter space distances in a leftward movement or letter space direction. That is to say, the winding-up capacity of the drum 139 counterbalances the discharge capacity of the driver 58 when the movements of the carriage in both directions are equal. There may be instances, however, when the winding-up capacity of the drum 139 will be in excess of the discharging capacity of the gear 58, as when the carriage is thrown to the right hand and then released by hand to some intermediate position without employing the transmitting features; or the liberal use of the space key 52 will break up this uniformity between the charge and discharge of energy at the gear 58. For this reason, if the spring 119 were secured at the inner end to the shaft 115 and the outer end to the spring box 118, it might happen that the excessive rightward movement of the carriage would over-charge the capacity of the spring 119, and the wound-up condition of the said spring would prevent further movement of the carriage in a right hand direction. To prevent the spring 119 from becoming overcharged through excessive rightward movements of the carriage, it will be remembered that the outer end of the said spring is not secured to the box 118, but to the split ring 120 that is maintained within the box by a degree of friction; and hence, when the spring 119 becomes overcharged and almost wholly wound upon the shaft 116, the split ring 120 rotates within the box 118 and in unison with the rotation of the shaft 115 and the wound-up spring 119.

It will be understood that when the push-rod 143 is shifted to disengage the pawl 126 and plain typewriting is desired, that a rightward movement of the carriage winds up the spring 119 but as the said pawl 126 is inactive, the carriage movement in a letter space direction is promoted by the reactions of both the spring 119 and the spring 132. The transmitter motor then, supplements the carriage motor to promote letter space movements of the carriage during the interval that the transmitting elements are rendered inactive and the machine is employed for typewriting only.

In the preferred form of my invention, the series of selecting bars 87 to 97 are arranged in horizontal planes to coöperate with a series of vertically arranged vibratory elements, as 22. And while I consider this arrangement preferable to some other arrangements, because of the equipoise of the said bars and the associated very light reactions from these comparatively bulky members; it is still practicable to associate these selecting members with other members of the printing elements, that are disposed in other than vertical planes. One form that suggests itself, is shown in the drawings at Figs. 19 and 20, where the printing elements are those employed in the well known Remington No. 6 machine.

In Figs. 19 and 20, 173 indicates the key levers that are fulcrumed at 174 and provided with individual springs 175. Each key lever is provided with a connection 176 that communicates with the pivoted typebar 177 adapted to swing upwardly and strike the underside of the platen 178. Here, the vibratory elements are the horizontally arranged key levers, with the selecting bars 87$^a$ to 97$^a$ arranged under the levers in vertical planes, and fulcrumed at 99$^a$. Each arm 98$^a$ at one side, is formed with a right angle arm 98$^b$ that stands vertically, with offset end to aline the upper free end with the position of the push bar 79$^a$ and the rods 78$^a$. The rods 78$^a$ and the bar 79$^a$, are pivoted to the upper ends of their associated arms 98$^b$, as shown in dotted lines at 179. These bars 87$^a$ to 97$^a$ may be counterbalanced by an overhanging arm 180 that is the continuation of the arms 98$^a$ beyond the position of the fulcrum 99$^a$. From this and previous descriptions, it will be understood, that when a key lever 173 is depressed, the initial motion thereof will vibrate the bar 87$^a$ and the associated push bar 79$^a$ to operate the tripping pawl 82. That a further movement of the key lever will vibrate certain of the selecting bars 88$^a$ to 97$^a$ and shift their associated rods 78$^a$ to vibrate the levers 64 and project the corresponding contacts 49. That on the return movement of the key lever, the counter-weight 180 will return the bar 87$^a$ and its associated members to normal position, to be actuated by the succeeding key lever, to first release the old sub-series of active contacts and lock the new sub-series in operative relation to the rotary brushes 59, substantially the same as described previously for the preferred form.

Having now fully described the nature of my invention, I desire to secure the same by Letters Patent, and therefore claim—

1. In an electrical transmitting machine, the combination of a character key and its associated printing element, a normally active contact, a series of normally inactive contacts, and means coöperative with the printing element to simultaneously compose a sub-group of said contacts in proper relationship to transmit the signal or signals representative of the associated character.

2. In an electrical transmitting machine, the combination of a character key, a series of normally inoperative contacts, a series of vibratory bars adapted to form a sub-series of operative contacts, and a transmitting brush released by said key to transmit the relationship of the operative contacts to each other.

3. In a combined typewriting and electrical transmitting machine, the combination of printing instrumentalities including character keys, a series of normally inoperative electrical contacts, and means associated with said printing instrumentalities and with said contacts for automatically grouping certain of said contacts in proper relationship to transmit signals simultaneously with the printing of the predetermined character.

4. In a combined typewriting and electrical transmitting machine, the combination of printing instrumentalities including character keys, a series of normally inoperative electrical contacts, connections between the printing instrumentalities and the contacts adapted to select and arrange in groups at will and in proper order the particular contacts necessary to transmit the signal or signals associated with an equivalent of the character printed.

5. In a combined typewriting and transmitting machine, the combination of a series of normally inoperative electrical contacts, printing instrumentalities including character keys for controlling said contacts, and means actuated by said printing instrumentalities for selecting and arranging in operative position the necessary contacts to transmit the Morse equivalent of the actuated printing element.

6. In a combined typewriting and transmitting machine, the combination of a series of normally inoperative electrical contacts, printing instrumentalities including character keys for controlling said contacts, connections intermediate said printing instrumentalities and said contacts for selecting operative sub-series of contacts, and key-actuated means for transmitting the individuality of the predetermined printing element.

7. In a combined typewriting and transmitting machine, the combination of a series of contacts normally inactive and individually movable to operative position, printing instrumentalities including character keys, key-actuated means for controlling and positioning said contacts in sub-series corresponding to the key actuated, and a brush arranged to make contact with the positioned contacts and not with the contacts that remain in normal position.

8. In a combined typewriting and transmitting machine, the combination of a series of electrical contacts normally inoperative and individually movable to operative positions, printing instrumentalities including character keys for controlling and positioning said contacts in operative sub-series, and means released by said character keys that transmit the signal or signals associated with the Morse equivalent of the printed character.

9. In a combined typewriting and electrical transmitting machine, the combination of a series of normally inoperative contacts, printing instrumentalities including character keys adapted individually to select and arrange said contacts in operative sub-series and simultaneously transmit the individuality of the active sub-series of contacts representative of the Morse equivalent of the active printing element.

10. In a combined typewriting and electrical transmitting machine, the combination of a spring-actuated carriage, printing instrumentalities including character keys, a series of normally inoperative contacts, operable in sub-series by said printing instrumentalities, a brush coöperating with said operative sub-series, a spring-motor for driving said brush, and means associated with the movement of the said carriage to recharge said spring motor.

11. In a combined typewriting and electrical transmitting machine, the combination of printing instrumentalities including a single set of character keys, a series of electrical contacts actuated in sub-series by said character keys, and means for silencing said contacts and leaving said character keys connected up to print when it is desired to print characters independently of the transmitter.

12. In a combined typewriting and electrical transmitting machine, the combination of printing instrumentalities including character keys, a series of electrical contacts actuated in sub-series by said printing instrumentalities, and hand-operated means for silencing at will the transmitting elements.

13. In a combined typewriting and electrical transmitting machine, the combination of printing instrumentalities including character keys, a series of electrical contacts actuated in sub-series by each printing element, a normally stationary brush to coöperate with the sub-series of contacts, and means for simultaneously releasing said brush with the formation of each sub-series of contacts.

14. In an electrical transmitting machine, the combination of a series of character keys, a series of normally inactive contacts, key-actuated means for forming from said inactive contacts sub-series of active contacts, a normally active contact coöperative with key-selected sub-series of said normally inactive contacts, and means released by the keys to transmit to the line circuit the signal or signals predetermined by the sub-series of operative contacts.

15. In an electrical transmitting machine, the combination of a series of character keys, a series of normally inactive contacts, key-actuated means for forming from said inactive contacts sub-series of active contacts, a normally active contact coöperative with key-selected sub-series of normally inactive contacts, and means released by the keys to coöperate with the sub-series of active contacts to transmit the signal or signals associated with the Morse equivalent of the predetermined character key.

16. In an electrical transmitting machine, the combination of a character key and its associated printing element, a normally active contact, a series of normally inactive contacts adapted to be resolved by the character key into a sub-series of active contacts to coöperate with the normally active contact to simultaneously transmit the associated Morse equivalent.

17. In an electrical transmitting machine, the combination of a character key and its associated printing element, a series of normally inactive contacts, key-actuated means for forming from said inactive contacts sub-series of active contacts, a normally active contact coöperative with a sub-series of said normally inactive contacts, and means to transmit the Morse equivalent simultaneously with the printing of the character.

18. In an electrical transmitting machine, the combination of a character key and its associated printing element, a series of normally inactive contacts, key-actuated means for forming from said inactive contacts sub-series of active contacts, a normally active contact coöperative with a series of normally inactive contacts that jointly are representative of a Morse character, and means released by the printing element to automatically transmit the number and relationship of the sub-series of active contacts.

19. In a combined typewriting and electrical transmitting machine, the combination of printing instrumentalities including character keys, a transmitting brush, a series of normally inoperative electrical contacts, a plurality of key-actuated bars associated with said contacts and adapted to compose sub-series of operative contacts relative to said transmitting brush, and means for releasing and actuating said brush.

20. In a combined typewriting and electrical transmitting machine, the combination of printing instrumentalities including character keys, a transmitting brush, a series of normally inoperative electrical contacts, means intermediate said printing instrumentalities and said contacts for selecting certain contacts to form an operative sub-series to coöperate with said transmitting brush simultaneously with the operation of the predetermined printing element.

21. In a combined typewriting and electrical transmitting machine, the combination of printing instrumentalities including character keys, a transmitting brush, a series of normally inoperative electrical contacts, a plurality of vibratory toothed bars coöperative with said printing instrumentalities to project certain of said contacts into operative relation with said transmitting brush.

22. In a combined typewriting and electrical transmitting machine, the combination of printing instrumentalities including character keys, a transmitting brush, a series of normally inoperative electrical contacts, a plurality of key-actuated bars adapted to select the proper contacts to compose sub-series in operative relation with said transmitting brush and to move the selected contact into the path of said brush, and means for successively releasing, actuating and arresting said brush simultaneously with the operation of each printing element.

23. In a combined typewriting and electrical transmitting machine, the combination of printing instrumentalities including character keys, a transmitting brush, a series of electrical contacts moved in sub-series by said printing instrumentalities into the path of said brush, and means for securing each sub-series in operative relation to said transmitting brush.

24. In a combined typewriting and electrical transmitting machine, the combination of printing instrumentalities including character keys, a transmitting brush, a series of electrical contacts actuated in sub-series by said printing instrumentalities, and means for retaining each sub-series of contacts in operative relation to the transmitting brush independently of the return movement of the keys.

25. In a combined typewriting and electrical transmitting machine, the combination of printing instrumentalities including character keys, a transmitting brush, a series of electrical contacts actuated in sub-series by each printing instrumentality, and means for retaining each sub-series of contacts in operative relation to the transmitting brush.

26. In a combined typewriting and transmitting machine, the combination of printing instrumentalities including character keys, a transmitting brush, a series of electrical contacts individually actuated to form sub-series by said printing instrumentalities, and a key-released means for retaining each sub-series of contacts in operative relation to the transmitting brush.

27. In a combined typewriting and electrical transmitting machine, the combination of printing instrumentalities including character keys, a series of electrical contacts actuated in sub-series by each printing element, a vibratory bar for retaining each sub-series of contacts in operative position, and a key actuated means for releasing each preceding sub-series simultaneously with the formation of a new sub-series of contacts.

28. In a combined typewriting and electrical transmitting machine, the combination of printing instrumentalities including character keys, a transmitting brush, means for operating said brush and for arresting and releasing it, a series of electrical contacts actuated in sub-series by each printing element, and means for retaining each sub-series in operative position simultaneously with the release of the transmitting brush.

29. In an electrical transmitting machine, the combination of a series of normally inoperative electrical contacts, a selective means to project said contacts to a uniform operative plane, and a brush coöperative with said contacts to transmit impulses of varying duration.

30. In an electrical transmitting machine, the combination of a series of normally inoperative electrical contacts, a selective means to project said contacts to a uniform operative plane, and a rotary brush coöperative with said operative contacts to transmit impulses of varying duration.

31. In an electrical transmitting machine, the combination of a series of normally inoperative contacts, a key-actuated selective means to project said contacts to a uniform operative plane, and a brush coöperative with said operative contacts to transmit impulses of varying duration.

32. In an electrical transmitting machine, the combination of a character key, a series of normally inactive contacts, a selective means to project certain of said contacts to a uniform active plane, and means released by the key to coöperate with the active contacts and transmit the Morse equivalent.

33. In an electrical transmitting machine, the combination of a normally active contact, and a series of normally inactive contacts adapted to be projected into operative relation with the active contact to jointly indicate a predetermined signal.

34. In an electrical transmitting machine, a normally active contact, a series of normally inactive contacts, a selective means adapted to project certain of the inactive contacts into operative relation with the active contact, and a transmitting brush.

35. In an electrical transmitting machine, the combination of character keys, a normally active contact, a series of normally inactive contacts, selective means for grouping certain of said inoperative contacts and projecting them into operative relation with the active contact, and means released by the key to transmit the joint relationship of the active contacts.

36. In an electrical transmitting machine, the combination of character keys, a normally active contact, a series of normally inactive contacts, a selective means for grouping certain of said inoperative contacts and projecting them into operative relation with the active contact, and a transmitting brush released by the key to transmit the relationship of the active contacts.

37. In an electrical transmitting machine, the combination of character keys, a normally active contact, a series of normally inactive contacts, a plurality of bars adapted to select certain of said inoperative contacts and project them into operative relation with the active contact, and means released by the keys to transmit the joint relationship of the active contacts.

38. In an electrical transmitting machine, the combination of character keys, a normally active contact, a series of normally inactive contacts, a plurality of toothed-bars adapted to select and project certain of the inoperative contacts into a uniform operative plane with the active contact, and means released by the keys to transmit the joint relationship of the active contacts.

39. In an electrical transmitting machine, the combination of a series of normally inactive contacts, a series of character keys adapted individually to select and project sub-groups of said contacts to a uniform active plane, and means released by each key to move in said plane and to transmit the relationship of the active contacts to each other.

40. In an electrical transmitting machine, the combination of a series of character keys, a normally active contact, a series of normally inactive contacts, key operated means for projecting sub-series of said inactive contacts to active position, and means released by the keys to transmit the signal or signals predetermined by the series of active contacts.

41. In an electrical transmitting machine, the combination of a series of character keys, a normally active contact, a series of individually movable inactive contacts, and a plurality of key-actuated toothed-bars adapted to select and project certain of the inactive contacts to a uniform plane with the active contact.

42. In a combined typewriting and electrical transmitting machine, the combination of printing instrumentalities including character keys, a series of normally inactive electrical contacts, a plurality of key actuated selectable bars associated with said contacts and adapted to compose sub-series of active contacts, and means released by the keys to transmit the individuality of the active sub-series simultaneously with the printing of the associated character.

43. In a combined typewriting and electrical transmitting machine, the combination of a spring-actuated carriage, printing instrumentalities, a series of electrical contacts, a brush coöperating with said contacts, and means controlled by the to and fro movement of the carriage to operate said brush.

44. In a combined typewriting and electrical transmitting machine, the combination of a spring-actuated carriage, printing instrumentalities, a series of electrical contacts, a spring actuated brush coöperating with said contacts, and means actuated by the to and fro movement of the carriage to recharge the brush-spring.

45. In a combined typewriting and electrical transmitting machine, the combination of a carriage and its motor, a transmitting apparatus and its associated motor, and means for silencing the transmitting elements and simultaneously causing the transmitter-motor to coöperate with the carriage-motor to move the carriage.

46. In an electrical transmitting machine, the combination of a plurality of character keys, a series of normally inactive contacts actuated by the keys to form active sub-series, a transmitting brush, and key-actuated means for releasing each preceding sub-series simultaneously with the formation of a new sub-series.

47. In an electrical transmitting machine, the combination of a plurality of character keys, a series of electrical contacts actuated in sub-series by the keys, a normally stationary transmitting brush, and means for releasing the brush simultaneously with the formation of each sub-series of contacts and means for moving said brush across the entire series of contacts for each character transmitted.

48. In an electrical transmitting machine, the combination of a plurality of character keys, a series of electrical contacts actuated in sub-series by the keys, a normally stationary brush, and means for releasing, means for actuating and means for arresting said brush simultaneously with the formation of each sub-series of contacts, each actuation of said brush being across the entire series of contacts.

49. In a combined typewriting and electrical transmitting machine, the combination of a carriage and its motor, a transmitting apparatus and its associated motor, means associated with the to and fro movement of the carriage to recharge the transmitter motor, and means to prevent overcharging the latter.

50. In an electrical transmitting machine, the combination of a brush; a series of contacts over which said brush rubs, each of said contacts by itself adapted to transmit a dot and a plurality of consecutive contacts together being adapted to transmit a dash; and means for grouping said contacts in sub-series.

51. In a combined typewriting and electrical transmitting machine, the combination of printing instrumentalities including character keys, a series of electrical contacts actuated in sub-series by said keys, a brush for coöperation with said contacts, and means for throwing said brush out of operation when it is desired to print without transmitting signals.

52. In an electrical transmitting machine, the combination of a brush, a plurality of character keys, a series of electrical contacts actuated in sub-series by the keys into the path of said brush, and means for moving said brush across the entire series of contacts once at each key-actuation.

In testimony whereof I have signed my name to this specification in the presence of two subscribing witnesses.

HERBERT H. STEELE.

Witnesses:
W. J. LOGAN,
JOHN MANUL.